United States Patent [19]

Pelrine

[11] Patent Number: 4,560,670

[45] Date of Patent: Dec. 24, 1985

[54] METHOD FOR REGENERATION OF CATALYSTS BY REMOVAL OF NITROGEN POISONS

[75] Inventor: Bruce P. Pelrine, Lawrenceville, N.J.

[73] Assignee: Mobil Oil Corporation, New York, N.Y.

[21] Appl. No.: 559,668

[22] Filed: Dec. 9, 1983

[51] Int. Cl.[4] ..................... B01J 29/38; C10G 47/16; C10G 45/64
[52] U.S. Cl. ........................................ 502/26; 208/28; 208/111; 208/254 H; 502/53; 502/515
[58] Field of Search ...................... 502/26, 29, 30, 31, 502/53, 515; 208/111

[56] References Cited

U.S. PATENT DOCUMENTS

| | | | |
|---|---|---|---|
| 3,048,536 | 8/1962 | Coonradt et al. | 502/53 |
| 3,459,675 | 8/1969 | Crecelius et al. | 502/53 |
| 3,523,887 | 8/1970 | Hanson et al. | 208/111 |
| 4,428,825 | 1/1984 | Ward et al. | 208/111 |

*Primary Examiner*—P. E. Konopka
*Attorney, Agent, or Firm*—Alexander J. McKillop; Michael G. Gilman; Howard M. Flournoy

[57] ABSTRACT

A method for the regeneration of end-of-cycle catalysts is provided wherein nitrogen and other deleterious poisons are removed prior to hydrogen treatment by passing over the catalyst bed a stripping mixture consisting of an alkyl amine whose basicity is much greater than that of the indigenous nitrogen compounds found in the catalyst.

7 Claims, No Drawings

METHOD FOR REGENERATION OF CATALYSTS BY REMOVAL OF NITROGEN POISONS

BACKGROUND OF THE INVENTION

This invention is directed to a method for the regeneration of catalysts which are useful in processes wherein various oleaginous base stocks are upgraded, for example, catalysts which are used in lube or distillate dewaxing processes.

It is well known in the art to regenerate catalyst systems by flushing them with steam or water, or a suitable hot gas or vapor, or even subjecting the catalyst to combustion to remove the impurities or poisons such as nitrogen compounds and various other carbonaceous matter which the catalysts have acquired during their utilization.

Spent or end-of-cycle catalysts, e.g., lube dewaxing or distillate dewaxing catalysts, such as for example, zeolites and the binders thereof, contain acquired nitrogen compounds which poision the catalyst and thereby render it less effective with respect to activity. The nature of these nitrogen poisons is not precisely known, but they are thought to be aromatic in character and are of the basic type. Typical basicities for aromatic amines are in the order of $K_b = 10^{-10}$ (Ref.: Organic Chemistry, 2nd Ed., Morrison and Boyd, page 721). These basic nitrogen compounds are generally classified (Re.: The Chemistry and Technology of Petroleum, James G. Speight, pg, 72-5, 1980) as being homologues of pyridine and pyrrole. Their $K_b$'s are about $2 \times 10^{-9}$ and $1 \times 10^{-14}$, respectively.

One well known regeneration procedure for these types of catalysts is to pass hydrogen over the catalyst at about 400 psig at a temperature of 900°–1000° F. for about 24 hours. However, despite this treatment, residual nitrogen remains on the catalyst. To alleviate this problem of not being able to remove substantially all the nitrogen poisons, the novel procedure disclosed hereinbelow is offered.

SUMMARY OF THE INVENTION

It has now been discovered that the nitrogen poisons may be removed from the aforementioned catalysts if, prior to conventional prior art treatments, e.g., hydrogen treatment, a stripping mixture consisting of an alkylamine in accordance with the invention and in a suitable solvent is passed over the catalyst under such conditions that their critical temperatures are not exceeded and the amine and the solvent are maintained in their liquid state.

DESCRIPTION OF PREFERRED EMBODIMENTS

The method disclosed herein is adaptable to a wide variety of catalytic systems or catalytic materials. For instance, the catalytic materials may be ordered porous crystalline aluminosilicates having a definite crystalline structure, both natural and synthetic or they may be amorphous and/or non-crystalline. The catalysts may also contain a hydrogenation component such as nickel, cobalt or molybdenum. In general, the process disclosed herein is suitable for use in regenerating catalyst involved in any hydrotreating processes. It is especially adaptable to lube dewaxing and distillate dewaxing processes. For example, U.S. Pat. No. Re 28,398 (of U.S. Pat. No. 3,700,585) to Chen et al. describes as a process for catalytic dewaxing with a catalyst comprising ZSM-5. U.S. Pat. No. 3,894,938 describes catalytic dewaxing process combined with catalytic hydrofinishing. U.S. Pat. No. 3,755,138 to Chen et al. is described as a process for mild solvent dewaxing to remove high quality wax from a lube stock which is then catalytically dewaxed to specification pour point. The ZSM-type catalysts disclosed therein are included among those suitable for use in this novel process.

The amines useful herein as described above are alkylamines, e.g., n-butylamine. However, any alkylamine having from about 1 to about 36 carbon atoms can be used herein. Dialkyl and trialkyl amines as well as monoalkyl amines are suitable. Suitable amines therefore include methylamine, butylamine and pentylamine, diethylamine, dipropylamine and triethylamine.

Although the instant process is in no way limited to zeolites, they are, however, especially adaptable to the described process. Suitable zeolites include but are not limited to those of the ZSM-5 type, e.g., ZSM-5, ZSM-11, ZSM-12, ZSM-21, ZSM-23, ZSM-35, ZSM-38 and ZSM-48 and the like and their hydrogen forms. It is noted that the binders for the respective catalyst are part of the catalyst system subject to this novel means of reactivation. ZSM-5 type catalysts are more fully described in, for example, U.S. Pat. No. 3,702,886; U.S. Pat. No. 3,709,979; U.S. Pat. No. 3,755,138; U.S. Pat. No. 3,832,449; U.S. Pat. No. 4,016,245 and U.S. Pat. No. 4,046,859, all of which are incorporated herein in their entirety by reference thereto.

Suitable solvents include such organic solvents as toluene and heptane and the like.

As noted hereinabove end-of-cycle catalysts such as distillate dewaxing and lube dewaxing catalysts are especially suitable to the novel process of regeneration disclosed herein. Such catalysts as mentioned hereinabove contain within, for example, the pores of the zeolite and the binder nitrogen compounds which poison the catalyst and thereby render the catalyst less effective with respect to activity. The standard prior art regeneration procedure referred to hereinabove comprising passing hydrogen over the end-of-cycle catalyst does not completely remove the basic nitrogen and other catalytic poisons. The novel process disclosed herein, however, substantially alleviates the problem of not being able to remove these poisons, particularly nitrogen. Prior to hydrogen treatment a stripping mixture consisting of an alkylamine, e.g., n-butylamine in a suitable solvent, (toluene) is passed over the catalyst which may be a catalyst bed or otherwise, at suitable conditions such that the amine and solvent are maintained in their liquid state without exceeding their critical temperatures. Butylamine being a stronger base than the aforementioned poisonous compounds replaces them in the catalyst system.

The following preferred embodiments are described herein, not as limitations, but as illustrations of the novel process hereof.

DESCRIPTION OF PREFERRED EMBODIMENTS

A typical end-of-cycle catalyst having the residue composition as shown in the Table was subjected to conventional hydrogen reactivation and also to the amine/hydrogen reactivation described herein. The comparative data derived from these treatments is also shown below in the Table.

TABLE

| Residue Remaining on Catalyst After Treatments | | | |
|---|---|---|---|
| | End-of-Cycle Catalyst | H$_2$ Reactivation[1] | Amine/H$_2$ Reactivation[2] |
| g/100 g Cat. | | | |
| Carbon | 39.53 | 3.90 | 2.55 |
| Hydrogen | 6.18 | .45 | 0.39 |
| Nitrogen | 0.243 | 0.036 | 0.026 |
| Sulfur | 0.395 | 0.000 | 0.000 |
| Total Wt. Residue | 46.348 | 4.386 | 2.966 |
| Normalized Composition | | | |
| Carbon, wt. % | | 88.92 | 85.97 |
| Hydrogen, Wt. % | | 10.26 | 13.15 |
| Nitrogen, wt. % | | 0.82 | 0.88 |
| Sulfur, wt. % | | 0.00 | 0.00 |
| | | 100.00 | 100.00 |
| H/C (Atomic) | | 1.38 | 1.84 |

Treatment Conditions
[1] Catalyst temperature = 950° F., 14 hours, 400 psig.
[2] Strip catalyst at 150° C. and 400 psig with 20% vol. % n-butylamine for 24 hours. Then hydrogen reactivate at 950° F. for 16 hours at 400 psig.

These data clearly establish the utility of the present novel process, that is, that the invention as disclosed herein results in a 30 percent or more reduction in total residue after hydrogen reactivation and also disclose a similar reduction in the amount of nitrogen remaining on the catalytic material.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for enhancing the regeneration of a substantially spent or end-of-cycle catalyst containing poisonous nitrogen compounds comprising the improvement wherein the catalyst off-stream and prior to being subjected to a hydrogen regeneration process is contacted under suitable conditions of time, temperature and pressure with a mixture consisting essentially of a $C_1$–$C_{36}$ alkylamine or mixtures thereof and a suitable solvent, maintaining said amine and said solvent at such temperatures that their critical temperatures are not exceeded and they are maintained in the liquid state, thereby exchanging the less basic poisonous nitrogen compounds contained in said catalyst for said alkylamine and thereafter carrying out said hydrogen regeneration process.

2. The process according to claim 1 wherein the catalyst is a spent or end-of-cycle hydrotreating catalyst.

3. The process of claim 1 wherein said alkylamine is selected from the group consisting of monoalkyl, dialkyl and trialkyl amines.

4. The process according to claim 1 wherein said amine is a $C_1$–$C_4$ alkylamine or mixtures thereof.

5. The process according to claim 4 wherein said amine is n-butylamine.

6. The process according to claim 1 wherein the catalyst is a ZSM-5 catalyst.

7. The process according to claim 5 wherein said catalyst is selected from the group consisting essentially of ZSM-5, ZSM-11, ZSM-12, ZSM-21, ZSM-23, ZSM-35, ZSM-38 and their hydrogen forms.

* * * * *